United States Patent Office

3,038,908
Patented June 12, 1962

3,038,908
NOVEL DERIVATIVE OF THE TETRACYCLINE
ANTIBIOTICS
John J. Beereboom, Waterford, Conn., assignor to Chas. Pfizer & Co., Inc., New York, N.Y., a corporation of Delaware
No Drawing. Filed Dec. 1, 1960, Ser. No. 72,874
6 Claims. (Cl. 260—346.2)

This invention is concerned with new, highly useful, acid stable derivatives of the tetracycline type antibiotic compounds. More particularly, it is concerned with the sulfuric acid esters of tetracycline, 5-hydroxytetracycline and 7-chlortetracycline and a process for the preparation thereof.

This application is a continuation-in-part of my copending application Serial No. 825,669 filed July 8, 1959, now abandoned.

Prior to this invention the preparation of derivatives of tetracycline, 5-hydroxytetracycline and 7-chlortetracycline has, with the exception of the acyl derivatives and certain D-ring alkylated derivatives, been limited to products, such as, the 4-desdimethylamino-, the 6-deoxy-, the 4A,12-anhydro-, which can be looked upon as partial degradation products of the parent compound. The lack of derivatives bearing a nuclear substituent is attributable to the instability of the molecule under for example, strongly acid conditions, and to the polyfunctional character of the groups present in the parent molecule. The preparation, therefore, of derivatives of adequate stability under acid conditions which can serve as intermediates for the preparation of heretofore unavailable nuclear derivatives of the tetracycline type antibiotic represents a significant advance in the art.

It has now been found possible to prepare the sulfuric acid ester of tetracycline, 5-hydroxytetracycline and 7-chlorotetracycline which are surprisingly stable in acid media and, therefore, highly useful as intermediates for further synthesis.

The novel compounds of the present invention have the formula

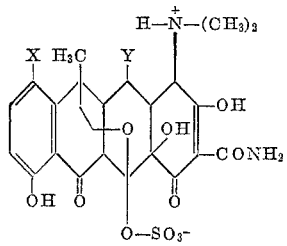

wherein X is selected from the group consisting of hydrogen and chloro; and Y is selected from the group consisting of hydrogen and hydroxyl, and at least one of X and Y is hydrogen.

These valuable and novel compounds are prepared in general, by treatment of tetracycline, 5-hydroxytetracycline and 7-chlorotetracycline with a sulfonating agent whereby a sulfuric acid ester is formed at the 12-position with simultaneous formation of a 6,12-hemiketal.

The process of this invention comprises in reacting the proper antibiotic compound in a reaction-inert solvent system with the sulfur trioxide complexes of N,N-dimethylaniline, dioxane, pyridine, N,N-dimethylformamide, triethylamine and even sulfur trioxide itself. Although the pyridine-sulfur trioxide complex, as well as the others listed, can be used in about stoichiometric proportions, an excess, generally from about 1 to 5 molar excess based on the sulfur trioxide present, is used. The use of greater excesses of the sulfur trioxide complex offers no advantage over that obtained with about a 4 molar excess. The sulfur trioxide complexes used as reactants are difficult to obtain pure and to maintain in a pure form. For this reason and to insure as complete utilization of the antibiotic compound as is possible, an excess of the sulfur trioxide complexes is generally used.

On the basis of available information, the order of reactivity of the sulfur trioxide complexes is dioxane, pyridine, N,N-dimethylaniline, N,N-dimethylformamide, triethylamine. However, the order of reactivity of the sulfur trioxide complexes is, for the purpose of this invention, considered subordinate to the order of preference of the sulfur trioxide complexes: pyridine, N,N-dimethylformamide, dioxane, N,N-dimethylaniline, triethylamine; by reason of their ease of preparation and handling, and the yields of sulfuric acid ester produced.

In addition to the preferred sulfur trioxide complexes mentioned above, the sulfur trioxide complex of many other tertiary organic bases can be used as reactant in the process of this invention; for example, trimethylamine, tripropylamine, tributylamine, dimethylcyclohexylamine, dimethylbenzylamine, 1-methylpiperidine, 4-methylmorpholine, 4-ethylmorpholine, α-picoline, β-picoline, pentamethylguanidine, pentaethylguanidine, isoquinoline.

The sulfur trioxide complexes utilized as reactants can also be produced in situ. In one modification of the process of this invention, the sulfur trioxide is added to a solution of the desired antibiotic compound, for example 5-hydroxy tetracycline, and the sulfur trioxide carrier, for example, pyridine, dioxane, N,N-dimethylaniline, N,N-dimethylformamide, in a suitable solvent. The molar ratio of sulfur trioxide to sulfur trioxide carrier should be at least 1:1. In the case of dioxane, the sulfur trioxide complex formed may contain 1 or 2 moles of sulfur trioxide per mole of dioxane. Indeed, in most instances a mixture of the mono and di-complexes is generally present. This is true even when the sulfur trioxide complex is preformed since it is not necessary to isolate a pure complex.

In still another modification of the process of this invention, the tertiary organic base-sulfur trioxide complex is generated in situ by reacting the tertiary organic base, for example pyridine, with chlorosulfonic acid as the sulfur trioxide source, in a 2 to 1 molar ratio.

Solvent systems suitable for the process of this invention include water, ethylene dichloride and such water miscible solvents as, for example, tetrahydrofuran, dioxane, N,N-dimethylformamide, dimethylsulfoxide, 1,2-dimethoxyethane and diethyleneglycol diethyl ether. These solvents can be employed in the anhydrous state or admixed with water. An anhydrous solvent system is generally used when the basic form of the tetracycline type antibiotic is used in order to permit a one-phase reaction system. For the same reason, water or an aqueous solution of a water miscible organic solvent is used when a salt, e.g. the hydrochloride salt, of the tetracycline type antibiotic is utilized as reactant.

The temperature is not a critical factor. Temperatures from about −50° C. to about 100° C. can be employed.

A temperature of from about 20° C. to about 70° C. is, however, preferred since it produces the desired products in good yield. Higher temperatures, while operative tend to result in diminished yields due to partial decomposition of the sulfur trioxide complexes when reaction is carried out at atmospheric pressure. The in situ production of the sulfur trioxide complex, particularly via the reaction of chlorosulfonic acid and, for example, pyridine, is advantageously conducted at a temperature of from about −50° C. to about 10° C. in order to avoid side reactions. Once the in situ formation of the sulfur trioxide complex is complete, the reaction temperature can, if desired, be increased to up to about 100° C.

Alternatively, the reaction can be carried out in a sealed tube, such as, a Carius tube. This procedure is advantageously used when operating at the upper limit of the temperature range since decomposition of the sulfur trioxide complex is minimized, and when employing sulfur trioxide as the sulfonating agent.

The time of reaction is likewise not a critical factor. The time necessary to obtain substantially complete reaction varies, of course, with the reaction temperature and the reactivity of the particular sulfur trioxide complex used. In general, higher reaction temperatures permit the use of relatively shorter reaction periods than do lower reaction temperatures. Reaction with the more reactive dioxane-sulfur trioxide complex is substantially complete in about 3 hours time whereas the less reactive triethylamine-sulfur trioxide complex requires considerably greater reaction periods particularly at low temperatures. In the preferred temperature range of from about 20° C. to 70° C., a reaction period of from about 3 hours to about 20 hours results in substantial conversion of the antibiotic compound to the desired sulfuric acid ester. Reaction periods longer than about 20 hours do not appear to result in further improvements in yield.

The addition of an organic base, such as, trimethylamine, triethylamine, to the reaction mixture is not necessary. The reaction proceeds smoothly in their absence to give satisfactory yields of the desired product. When an acid salt of the antibiotic compound, for example 5-hydroxy tetracycline hydrochloride, is used as reactant, it is desirable to add sufficient base to neutralize the acid present in order to expedite the reaction. Failure to neutralize the acid present results in a slow reaction and generally requires the use of a large excess of the sulfur trioxide complex.

The products are recovered from the reaction mixture by conventional methods, i.e., by filtration. When using a non-aqueous solvent system, e.g. N,N-dimethylformamide or dimethylsulfoxide, optimum recovery is obtained through addition of a solvent, such as, water or methanol, which is miscible with the reaction solvent and which is a non-solvent for the product. The use of an aqueous solvent system will, of course, generally eliminate the necessity of adding another solvent to effect optimum recovery. The products thus obtained are slurried briefly with dilute aqueous hydrochloric acid to facilitate removal of the sulfur trioxide carrier, for example, pyridine, then filtered and dried. Washing with volatile organic solvents can be used to expedite drying. The product thus produced is, if desired, recrystallized from N,N-dimethylformamide to give the pure anhydrous compound.

The compounds of this invention are isotelic and exhibit a lower order of antibacterial activity in vitro than do the parent compounds. However, the in vivo antibacterial activity is characterized by a gradual rise approaching that of the parent compound itself due to hydrolysis with conversion to the parent compound. The in vitro antibacterial activity of the sulfuric acid ester of 5-hydroxy tetracycline, determined under standard conditions, is given in Table I. The Minimum Inhibitory Concentrations (MIC) in mcg./ml. are reported.

Table I.—Biological Activity of 5-hydroxytetracycline Sulfuric Acid Ester

| Organism: | MIC |
|---|---|
| Micrococcus pyogenes var. aureus | 50 |
| Streptococcus pyogenes | 12.5 |
| Streptococcus faecalis | 100 |
| Diplococcus pneumoniae | 100 |
| Erysipelothrix rhusiophathiae | 100 |
| Listeria monocytogenes | 100 |
| Bacilus subtilis | 12.5 |
| Lactobacillus casei | 100 |
| Bacterium ammoniagenes | 100 |
| Aerobacter aerogenes | 100 |
| Escherichia coli | 100 |
| Proteus vulgaris | 100 |
| Pseudomonas aeruginosa | 100 |
| Salmonella typhosa | 100 |
| Salmonella pullorum | 100 |
| Klebsiella pneumoniae | 100 |
| Neisseria gonorrhoeae | 25 |
| Hemophilus influenzae | 25 |
| Shigella sonnei | 100 |
| Erwinia amylovora | 100 |
| Phytomonas tumefaciens | 100 |
| Brucella bronchiseptica | 100 |
| Malleomyces mallei | 100 |
| Desulfovibrio desulfuricans | 50 |
| Vibrio comma | 25 |
| Mycobacterium 607 | 12.5 |
| Candida albicans | 100 |
| Pityrosporum ovale Traub | 100 |
| Pityrosporum ovale 12078 | 100 |
| Saccharomyces cerevisiae | 100 |
| Antibiotic resistant strains of Micrococcus pyogenes var. aureus: | |
| No. 276 | 100 |
| No. 400 | 100 |
| Xanthomonas vesicatoria | 100 |
| Phytomonas phaseolicola | 100 |

The novel products of this invention are useful as antibacterial agents for treating a number of infections caused by susceptible gram-positive organisms in animals, including man.

The products of this invention can be used in dosage forms similar to those in which the parent compounds are used. They can, for example, be incorporated with various suitable pharmaceutical carriers in dosage forms which are of value for administration to animals in the treatment of a variety of infections. Essentially any inert pharmaceutical carrier may be used, that is, any substance which is useful for the preparation of dosage forms and which does not tend to inactivate the antibiotic substance. Thus, the products may be incorporated into capsules with various inert materials or may be converted into tablets by incorporation with certain tableting agents such as, gums either natural or synthetic, sweetening agents, coating agents and so forth. Alternatively, the products of the present invention may be utilized in the form of injectable preparations or as dusting powders. It should be noted that upon extended storage in aqueous and alcoholic solutions the products may hydrolyze to an appreciable extent, reverting back to the parent compound. Certain other dosage forms, such as, ointments or salves may be prepared with a suitable base, preferably a nonhydrophilic base, such as, petroleum jelly and substances of this nature.

The sulfuric acid ester of 5-hydroxytetracycline is a pale-yellow crystalline solid, insoluble in acids, chloroform, acetone, ether, alcohols, water and aromatic hydrocarbon solvents, such as, benzene, toluene and xylene; and somewhat soluble in N,N-dimethylformamide and dimethylsulfoxide. It can be purified by recrystallization from N,N-dimethylformamide.

5-hydroxytetracycline sulfuric acid ester has unexpectedly high stability in acid solution. It is very unstable in basic solution and undergoes decomposition with formation of degradation products of 5-hydroxytetracycline. The product regenerates 5-hydroxytetracycline on standing in alcohols, such as, methanol. The conversion rate increases with increasing temperature and occurs quite rapidly in boiling methanol. Apo-5-hydroxytetracycline appears as by-product. A freshly prepared solution of the sulfuric acid ester of 5-hydroxytetracycline in 0.01 N HCl—CH$_3$OH exhibits maxima in the ultraviolet region at 262 and 332 with log ε values of 4.39 and 3.76, respectively; and in 0.01 N NaOH—CH$_3$OH at 260 and 372 mu with log values of 4.40 and 3.70, respectively. The initial ultra-violet absorption spectrum is similar to that of 8-hydroxytetralone, the chromophore of rings C and D. Slow hydrolysis of the compound is indicated by a change in the ultraviolet absorption spectrum on standing. After approximately 24 hours, a 0.01 N NaOH—CH$_3$OH solution exhibits absorption maxima at 250–265 and 336 mu. Its infrared spectrum (KBr pellet) exhibits strong absorption maxima at 3333, 1661, 1618, 1543, 1456, 1355, 1266, 1232, 1178, 1099, 967, 827 and 810 reciprocal centimeters.

In addition to its characteristic ultraviolet and infrared absorption spectra, 5-hydroxytetracycline sulfuric acid ester can be identified by means of paper chromatography. The R$_f$ value using chloroform:pyridine:nitromethane: n-butanol (10:3:20:5) as mobile phase and MacIlvaines buffer (phosphate/citrate), pH 3.5, as immobile phase, is 0.65.

It reacts with benzenesulfonyl chloride in pyridine to give the sulfuric acid ester of 5-hydroxytetracyclinonitrile. When treated with dilute aqueous sodium bicarbonate, a complex mixture of four components, one of which has been identified by paper chromatography as 4-desdimethylamino-5-hydroxytetracycline is formed. Reaction with zinc dust in acetic acid yields an acid insoluble material believed to be the 4-desdimethylamino derivative.

The novel, acid stable, sulfuric acid esters of this invention serve as intermediates for the preparation of a variety of D-ring substituted derivatives which cannot be obtained from the parent compounds. For example, 5-hydroxytetracycline sulfuric acid ester can be nitrosated in the D-ring, or in the 4-position, to give a nitroso derivative which can, in turn, be utilized as intermediate for the preparation of an amino derivative of 5-hydroxytetracycline. The D-ring substituted amino derivative can then be converted to diazonium salts and various coupling products thereof, for example, with phenols and anilines. Furthermore, this amino group can be replaced by other groups by means of well known reactions which proceed via the diazonium salt, such as, halogen by the Gattermann or sandmeyer reaction; hydroxyl by acid hydrolysis; nitro- by reaction with sodium nitrite, arsonic acid by the Bart reaction, fluoro by the Schiemann reaction.

The nitrosation product of the 5-hydroxytetracycline sulfuric acid ester is obtained as a brown crystalline product which, when precipitated from dimethylformamide solution is obtained as a pale yellow solid which gives a red color with concentrated sulfuric acid. Its infrared absorption spectrum (KBr) exhibits absorption maxima at 3390, 1667–1575 with a peak at 1592 reciprocal centimeters. It is soluble in sodium bicarbonate solution and insoluble in dilute (5%) hydrochloric acid. Paper chromatography in the solvent system mentioned above gives an R$_f$ value of 0.85.

Various other substituents can be introduced into the D-ring of 5-hydroxytetracycline via the sulfuric acid ester of this invention. Bromination, nitration and sulfonation can be employed to introduce a bromo, nitro or sulfonic acid group, respectively. Coupling with p-nitrobenzenediazonium chloride in aqueous dimethylformamide at about neutral pH to pH 3 serves as a method for introducing a benzenediazonium residue into the molecule.

The sulfuric acid esters of tetracycline and 7-chlorotetracycline undergo similar reactions to produce corresponding products which are useful as intermediates for the further synthesis of useful tetracycline products.

The following examples are given by way of illustration and are not to be regarded as limitations of this invention many variations of which are possible without departing from the spirit or scope thereof.

EXAMPLE I

To a stirred solution of 4.6 gms. (0.01 mole) of anhydrous 5-hydroxytetracycline in 40 ml. of dry tetrahydrofuran there is added 3.5 gms. (0.022 mole) of pyridine-sulfur trioxide complex. After 16 hours, with continuous stirring at room temperature, the resulting suspension is filtered and the crude solid slurried with 25 ml. of 2% hydrochloric acid for 10 minutes, filtered and thoroughly washed with methanol followed by ether. The pale-yellow crystalline sulfuric acid ester melts at 210° C. (dec.). Recrystallization from N,N-dimethylformamide gives the pure products; M.P. 225° C. (dec.).

Analysis.—Calcd. for C$_{22}$H$_{24}$O$_{12}$N$_2$S: 48.89% C; 4.47% H; 5.28% N; 5.92% S. Found: 49.0% C; 4.5% H; 4.9% N; 5.6% S.

Its infrared spectrum (KBr) exhibits strong absorption maxima at 3333, 1661, 1618, 1543, 1456, 1355, 1266, 1232, 1178, 1099, 967, 827 and 810 reciprocal centimeters. It exhibits maxima in the ultraviolet region at 262 and 332 mu with log ε values of 4.39 and 3.76, respectively when dissolved in 0.01 N HCl—CH$_3$OH solution and at 260 and 372 mu with log ε values of 4.40 and 3.70, respectively in 0.01 N NaOH—CH$_3$OH solution. The spectrum of the latter solution changes on standing until, after 24 hours, the absorption maxima occurs at 250–265 and 336 mu.

Paper chromatography using Whatman Paper No. 1 buffered to pH 3.5 with MacIlvaines buffer (phosphat/citrate), and chloroform:pyridine:nitromethane:n-butanol (10:3:20:5) as the mobile phase gives an R$_f$ value of 0.65.

EXAMPLE II

Following the procedure of Example I the same product is obtained with the following solvents: dioxane, 1,2-dimethoxyethane, diethyleneglycol diethyl ether, N,N-dimethylformamide, dimethylsulfoxide, water, ethylene dichloride, water-tetrahydrofuran (1:9 v./v.), water-dioxane (1:19 v./v.) and water-tetrahydrofuran (1:1 v./v.).

EXAMPLE III

The general procedure of Example I is followed here but using the modifications listed in the following table. The crude product obtained is not purified further. In each case the 5-hydroxytetracycline sulfuric acid ester is produced and is determined by paper chromatography.

| SO$_3$ Complex | M Complex, M Oxytet | Solvent[1] | Time (Hours) | T, ° C. |
|---|---|---|---|---|
| pyridine | 5 | THF | 10 | 25 |
| Do | 3 | THF | 10 | 70 |
| Do | 3 | THF | 20 | −20 |
| Do | 1 | THF | 10 | 20 |
| Do | 5 | Dioxane | 5 | 70 |
| dioxane | 2 | THF | 3 | 20 |
| Do | 2 | Dioxane | 20 | 20 |
| dimethylaniline | 2 | THF | 15 | 25 |
| dimethylformamide | 2 | THF | 15 | 25 |
| pyridine | 3 | DMF | 15 | 50 |
| Do | 1 | THF | 20 | 20 |
| SO$_3$ | 4 | THF | 15 | 25 |
| pyridine | 2 | DEG | 10 | 100 |
| dioxane | 2 | THF | 20 | 0 |

[1] THF—tetrahydrofuran; DMF—N,N-dimethylformamide; DEG—diethyleneglycoldiethylether.

EXAMPLE IV

Pyridine-sulfur trioxide complex (0.16 gm., 1 mmole) is added to a solution of tetracycline (0.444 gm., 1 mmole) 25 ml. of tetrahydrofuran, the suspension stirred for 16 hours at room temperature and then filtered to give the crude sulfuric acid ester of tetracycline.

In like manner, 5-hydroxy tetracycline and 7-chlorotetracycline are converted to their respective sulfuric acid esters.

EXAMPLE V

Following the general procedure of Example IV, tetracycline and 7-chlorotetracycline are converted to their sulfuric acid esters under the following conditions:

| Antibiotic | SO₃ Complex | M Complex, M Antibiotic | Solvent | Time (Hours) | T,° C. |
|---|---|---|---|---|---|
| tetracycline | pyridine | 3 | DEG | 16 | 20 |
| Do | do | 3 | DEG | 16 | 100 |
| Do | SO₃ | 4 | THF | 10 | 25 |
| Do | dioxane | 2 | dioxane | 15 | 70 |
| Do | pyridine | 3 | water-THF (1:9 v./v.) | 16 | 20 |
| chlorotetracycline | do | 3 | THF | 16 | 20 |
| Do | SO₃ | 5 | THF | 10 | 25 |
| Do | dioxane | 4 | dioxane | 15 | 70 |
| Do | DMF¹ | 2 | THF | 10 | 20 |
| Do | pyridine | 3 | THF | 20 | 0 |
| Do | do | 3 | water-THF (1:9 v./v.) | 16 | 20 |

¹ DMF—N,N-dimethyl formamide.

EXAMPLE VI 5-hydroxytetracycline (2.3 gms.), 20 ml. of tetrahydrofuran and pyridine-sulfur trioxide complex (2.6 gms.), a 1 to 3 molar ratio, are heated for 10 hours in a Carius tube at 95°–100° C. The brown suspension is filtered and worked up according to the procedure of Example I. Recrystallization of the solid from dimethylformamide gives the sulfuric acid ester of 5-hydroxytetracycline identical to the product of Example I.

EXAMPLE VII

The procedure of Example I is repeated, but at the reflux temperature of tetrahydrofuran, to give the sulfuric acid ester of 5-hydroxytetracycline.

EXAMPLE VIII

To a well stirred suspension of 5-hydroxytetracycline hydrochloride (2.5 gms.) in 30 ml. of anhydrous tetrahydrofuran at 20° C. is added 0.5 gm. of triethylamine. After 15 minutes, 2.7 g. of the sulfur trioxide complex of triethylamine is added and the reaction then carried out according to the procedure of Example I to give 5-hydroxytetracycline sulfuric acid ester.

EXAMPLE IX

To a well stirred solution of 5-hydroxytetracycline (2.3 gms.), pyridine (1.97 gms.) and 30 ml. of tetrahydrofuran at 0° C. is added 2.0 gms. of sulfur trioxide. The molar ratio of 5-hydroxytetracycline:pyridine:sulfur trioxide is 1:5:5. After 16 hours at 0° C., the reaction mixture is filtered and worked up according to the procedure of Example I to give the sulfuric acid ester of 5-hydroxytetracycline.

EXAMPLE X

To a solution of 5-hydroxytetracycline (4.6 gms.), pyridine (4.75 gms.) in 60 ml. of tetrahydrofuran at −50° C., is added over a ninety minute period, 3.5 gms. of chlorosulfonic acid: (molar ratio of 5-hydroxytetracycline:chlorosulfonic acid:pyridine is 1:3:6). After 20 hours at −50° C. the reaction mixture is filtered and the product identified by paper chromatography as in Example I.

In like manner, tetracycline and 7-chlorotetracycline are converted to their respective sulfuric acid esters.

EXAMPLE XI

The procedure of Example X is repeated with 5-hydroxytetracycline but, after one hour at −50° C., the reaction mixture is removed from the cooling bath and allowed to reach room temperature. Following 15 hours at room temperature the reaction mixture is worked up according to the procedure of Example I to give the desired sulfuric acid ester.

EXAMPLE XII

The procedure of Example IX is repeated but substituting pyridine by equivalent amounts of dioxane and dimethylformamide. The product obtained in each instance is identical to the product of Example I.

EXAMPLE XIII

*Nitrosation of the Sulfuric Acid Ester of 5-Hydroxytetracycline*

To a suspension of the sulfuric acid ester of 5-hydroxytetracycline (5.4 g., 0.01 mole) in 50 ml. of acetone cooled to 5° C. is added a solution of 10 g. sodium nitrite in 50 ml. of water followed by 50 ml. of 1 N hydrochloric acid. The mixture is stirred and held at 5° C. for 20 hours.

The brown crystalline nitrosation product which forms is removed by filtration. It is purified by precipitation from dimethylformamide by addition of 1–5 volumes of water. The pale yellow solid thus obtained gives a red color with concentrated sulfuric acid. Its infrared absorption spectrum (KBr) exhibits absorption maxima at 3390, 1667–1575 with a peak at 1592 reciprocal centimeters. It is soluble in sodium bicarbonate solution and insoluble in dilute (5%) hydrochloric acid. Paper chromatography in the solvent system mentioned above gives an $R_f$ value of 0.85.

What is claimed is:

1. A compound of the formula $$\begin{array}{c} \text{X} \quad \text{CH}_3 \quad \text{Y} \quad \text{H}-\overset{+}{\text{N}}-(\text{CH}_3)_2 \\ \text{[tetracycline ring structure]} \\ \text{OH} \quad \text{O} \quad \text{O} \quad \text{O}-\text{SO}_3^- \\ \quad\quad\quad\quad\quad\quad -\text{OH} \\ \quad\quad\quad\quad\quad\quad -\text{CONH}_2 \end{array}$$

wherein X is selected from the group consisting of hydrogen and chloro; Y is selected from the group consisting of hydrogen and hydroxyl and at least one of X and Y is hydrogen.

2. The compound of claim 1 wherein X is hydrogen and Y is hydroxyl.

3. The compound of claim 1 wherein Y is hydrogen and X is chloro.

4. The compound of claim 1 wherein X and Y are hydrogen.

5. The process which comprises reacting a compound selected from the group consisting of tetracycline, 5-hydroxytetracycline and 7-chlorotetracycline with a sulfonating agent selected from the group consisting of sulfur trioxide and the sulfur trioxide complexes of pyridine, dioxane, triethylamine, N,N-dimethylformamide and N,N-dimethylaniline in a reaction-inert solvent at a temperature of from about −50° C. to about 100° C., wherein the mole ratio of sulfur trioxide present in the reaction mixture to the selected tetracycline is at least about 1:1.

6. The process of claim 5 wherein the reaction inert solvent is selected from the group consisting of tetrahydrofuran, diethyleneglycol diethyl ether and the temperature is from about 20° C. to about 70° C.

References Cited in the file of this patent
UNITED STATES PATENTS 2,854,476     Chenicek et al. _____ Sept. 30, 1958

OTHER REFERENCES

Hardy et al.: Jour. Am. Chem. Soc., vol. 74, pages 5212–14 (1952).